: US 7,433,059 B2
(45) Date of Patent: Oct. 7, 2008

(12) United States Patent
van der Knijff et al.

(54) DEVICE FOR TREATING BULBOUS OR TUBEROUS PLANTS

(75) Inventors: Gerard Cornelis van der Knijff, c/o ERCmachinery, Fabrieksweg 2, 8304 Emmeloord (NL); Arie van der Knijff, c/o ERCmachinery, Fabrieksweg 2, 8304 Emmeloord (NL); Erwin Paul Maria Bakker, Eindhoven (NL)

(73) Assignees: Gerard Cornelis Van der Knijff, Emmeloord (NL); Arie Van der Knijff, Emmeloord (NL)

( * ) Notice: Subject to any disclaimer, the term of this patent is extended or adjusted under 35 U.S.C. 154(b) by 325 days.

(21) Appl. No.: 10/998,762

(22) Filed: Nov. 29, 2004

(65) Prior Publication Data

US 2006/0275027 A1 Dec. 7, 2006

Related U.S. Application Data

(63) Continuation of application No. PCT/NL03/00402, filed on May 28, 2003.

(30) Foreign Application Priority Data

May 28, 2002 (NL) .................................. 1020698

(51) Int. Cl.
| | |
|---|---|
| G01B 11/14 | (2006.01) |
| G01B 11/24 | (2006.01) |
| G01B 11/30 | (2006.01) |
| G06K 9/00 | (2006.01) |
| A23N 15/02 | (2006.01) |
| A23N 15/04 | (2006.01) |
| A47J 21/00 | (2006.01) |
| A01D 23/02 | (2006.01) |

(52) U.S. Cl. ..................... 356/614; 356/601; 382/110; 99/546; 56/121.4

(58) Field of Classification Search ....................... None
See application file for complete search history.

(56) References Cited

U.S. PATENT DOCUMENTS

| | | | |
|---|---|---|---|
| 3,606,917 | A | 9/1971 | Orlowski |
| 4,998,468 | A | 3/1991 | Nagaoka |
| 5,858,429 | A | 1/1999 | Wallace |

(Continued)

FOREIGN PATENT DOCUMENTS

DE 198 02 271 2/2000

(Continued)

OTHER PUBLICATIONS

English Translation of Title and Abstract of WO97/27765 dated Aug. 7, 1997.

*Primary Examiner*—Gregory J. Toatley, Jr.
*Assistant Examiner*—Gordon J Stock, Jr.
(74) *Attorney, Agent, or Firm*—Ladas and Parry LLP

(57) ABSTRACT

Device for treating bulbous or tuberous plants, particularly onions, provided with a green end and a root end and a bulb axis extending therethrough, comprising means for holding the bulbs, means for cutting the green end and the root end off from the bulbs, means for by means of image registration determining the orientation in the device of the bulbs held in the holding means, and means for orienting the onions in an orientation adjusted to the cutting means on the basis of said determination.

22 Claims, 14 Drawing Sheets

U.S. PATENT DOCUMENTS 7,152,795 B2 * 12/2006 Tsikos et al. ........... 235/462.01

FOREIGN PATENT DOCUMENTS

| GB | 2077577 | A | * | 12/1981 |
| JP | 2002238531 | A | * | 8/2002 |
| NL | 9 000 218 | | | 8/1991 |
| NL | 1 001 865 | | | 2/1996 |
| WO | 97/27765 | | | 8/1997 |

* cited by examiner

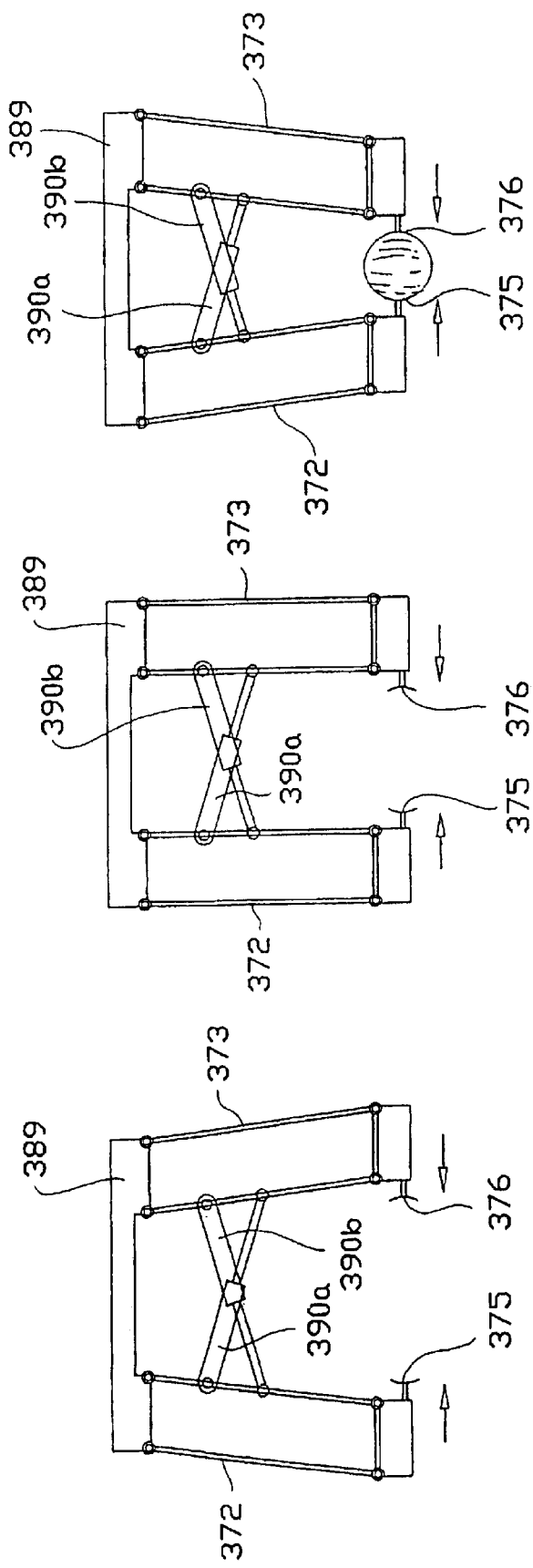

DEVICE FOR TREATING BULBOUS OR TUBEROUS PLANTS

This is a continuation of copending International Application PCT/NL03/00402 filed on May 28, 2003, which designated the U.S., claims the benefit thereof and incorporates the same by reference.

BACKGROUND OF THE INVENTION

The invention relates to a device for treating bulbous or tuberous plants.

The invention furthermore relates to a device for orienting bulbous or tuberous plants for cutting off their root end and their green end.

The invention further relates to a device for removing the tunic from bulbous or tuberous plants.

DISCUSSION OF THE PRIOR ART

It is known to peel onions wet, the onions being placed in a drum provided with scrapers and during revolving the drum under wet conditions being stripped of green end or head and root end or tail, as well as of the outer layer, also called the tunic.

The peeling often takes place in a dry manner, the head and the tail first being removed, and after that an incision being made in the tunic after which the tunic is blown from the onion by means of compressed air. An example of such a device has been described in Dutch patent 1001865. Here the onions are manually placed in an orientation that is right for head-tail cutting. The incision-making takes place by passing the onion through an incision station.

From Dutch patent application 90.00218 an onion peeling device is known with which the onions are manually placed on a plate, which plate is first passed past a beheading/untailing station, where at the lower side the tail is cut off with a rotating blade and at the upper side the head is bored out. In a subsequent station the onions are clamped at the cut off ends, and moved upwards past two spring-mounted curved blades.

The treatment of onions requires a lot of actions, and thus a lot of man-power. Onion peeling machines are indeed more or less automated, yet a lot of failures arise and/or the capacity is not as high as one would like. Automating the orienting of onions has however always appeared to be a difficult matter. In the past it was attempted to mechanically orient the onions though those solutions appeared to be failure prone.

It is an object of the invention to improve on this.

It is a further object of the invention to provide a device for orienting onions and the like for head/tail-cutting, which is reliable and capable of operating at high speed.

Another object of the invention is to provide a device for peeling onions and the like which requires a minimum of manpower for operating.

A further object of the invention is to provide a device for peeling onions and the like which is capable of working fully automatically.

SUMMARY OF THE INVENTION

From one aspect the invention provides a device for treating bulbous or tuberous plants, particularly onions, provided with a green end and a root end and a bulb axis extending therethrough, comprising holders for the bulbs, means for cutting the green end and the root end off from the bulbs, means for by means of image registration determining the orientation in the device of the bulbs held in the holding means, and means for orienting the onions in an orientation adjusted to the cutting means on the basis of said determination.

Determining the image of the full circumference of the bulb provides reliable information on the basis of which parts for the manipulation and treatment of the bulb can be controlled. In this way failure is minimised. It even offers the possibility to treat each bulb in a manner adapted to it, as a result of which the quantity of waste can be minimised.

In a further embodiment of the device the means for determining the orientation comprise a light source for illuminating the bulb, as a result of which a clear image of the circumference can be obtained. The light source preferably is adapted for emitting so-called structured light. This may for instance be a dot or a line.

In a preferred embodiment the light source at least comprises a line laser. In this way a sharp line, which is clearly visible to a camera, is positioned on the bulb surface.

Preferably the light source comprises two line lasers, oriented in the same plane, yet situated on opposite sides with respect to a plane that is perpendicular to the axis and passes through the first camera. In this way it is achieved that the bulb surface portions, which with respect to the camera are situated more to the sides of the bulb, are clearly visible.

In a further development the device according to the invention comprises a first camera, as well as means for rotating the first camera and the bulb in question with respect to each other about an axis relatively stationary with respect to the camera in the image of the camera, and means for recording the circumferential shape of the bulb perceived by the camera and means for analysing the registration for determining the circumferential shape. The image information of the camera is passed on to a central control unit, in which the circumferential image of the bulb in question is stored.

Preferably the means for determining the orientation are adapted for establishing the orientation of the bulb after the image registration, on the basis of the known registration direction of the first camera, the registration of the first camera related to the time or the angle of rotation and the angle of rotation traversed after ending the registration, the orienting means comprising first orienting means for orienting the bulb in the plane of rotation on the basis of the determined orientation.

Preferably the rotation means are adapted for rotating the bulb about its axis. By rotating the bulb about its own axis a full and reliable image can be obtained in a simple manner by the camera of the shape of the outer surface of the bulb.

Preferably the bulb rotation means are adapted for causing the bulb to rotate at a uniform speed, so that the number of images per time unit can be constant.

Preferably the axis is substantially vertically oriented.

With the image registration of the first camera it is possible in principle to obtain a full image of the spacial orientation of the bulb, on the basis of which the orientation means can be controlled. It is also possible to calculate the cutting planes on the basis thereof. In order to ensure a very reliable operation of the device, the device may furthermore comprise means for checking the orientation in the plane of rotation given by the first orienting means. The device may furthermore comprise additional orienting means for correction of the orientation in the plane of rotation.

The checking means may comprise a second camera for recording the contour of a stationary bulb, and means for determining the orientation at that location of the bulb axis with respect to the device by comparing the contour image with the circumferential image made by the first camera, the additional orienting means being controlled on the basis of the outcome of said comparison. Thus the control unit recognises the projection or contour image of the bulb at that location in the collection of images that form the circumferential image. After that the additional orienting means can be controlled on the basis of the outcome of said comparison.

For determining the contour the device preferably has means for contrasting the bulb circumference with respect to the background. The contrasting means may comprise a bright background surface that can be placed at the side facing away from the second camera.

From a further aspect the device furthermore comprises a second camera for recording the contour of a stationary bulb and means for determining the orientation at that location of the bulb axis in a plane perpendicular to the plane of rotation, the second camera being positioned downstream of the first camera. In this way it is possible to simultaneously carry out the consecutive camera recordings for consecutive bulbs, and possibly also having the orienting of the bulb coincide with the recording of the circumferential shape of a following bulb.

Preferably the device according to the invention is furthermore provided with means for calculating the cutting planes for green end and root end on the basis of the image registration, so that the quantity of waste can be kept to a minimum. The recording of the second camera, when present can be used for that purpose.

The bulb holders preferably comprise a first holder member for engaging a first side of the bulb and a second holder member for engaging an opposite, second side of the bulb, the first holder member being positioned rotatably about a holder axis. It is advantageous here when the first holder member comprises several bulb engagement surfaces for engaging the first side of the bulb at locations evenly distributed over the axis. Thus the bulb surface covered by the holder members can remain limited, as a result of which the circumferential image can be as complete as possible.

Rotation of the bulb, in a constructively simple embodiment, will be enhanced when the second holder member forms a rotary bearing for the second side of the bulb.

The stability of the bulb during rotation and orienting is enhanced when the rotation means are positioned for rotation of the first holder member about a vertical axis.

In a further embodiment the holder members are arranged on a circulating frame, such as a carousel, and wherein at the location of the registration location of the first camera rotation means are positioned which can be brought in and out of driving coupling with the first holder members. Thus rotation drive means are saved on and the carousel is limited as to weight and kept simple as to structure.

Preferably the carousel axis is vertical, the stability of the bulbs being enhanced and the positioning of the aforementioned parts is simpler as to structure.

It is advantageous when rotation means are positioned at the location of the image registration location of the contour of the bulb, which means can be brought in and out of driving coupling with the first holder members and rotate the first holder means in accordance with the aforementioned outcome of the comparison to a known orientation of the bulb axis in a plane perpendicular to the holder axis.

The first holder members may be a part of the orienting means, particularly the first orienting means and/or the additional orienting means.

The rotation means may comprise first rotation means, positioned at the location of a first station, where the first camera has been positioned, for cooperation with the first orienting means, and second rotation means, positioned at the location of a next, second station, where the second camera has been positioned, for cooperation with the additional orienting means. Thus rotation drive means are saved on at that location as well, and the carousel is limited as to weight and kept simple as to structure.

In a further development of the device according to the invention it is furthermore provided with conveyor means for conveying the bulb from the bulb holders past the cutting means, which conveyor means are provided with two clamping members for taking over the bulb from the holder members and clamping the bulb according to a clamping line perpendicular to the holder axis. As a result the taking over of the bulbs can take place in a reliable manner. Furthermore the conveying movement can be utilised for cutting.

Preferably the orienting means comprise second orienting means for bringing the bulb in a correct orientation for the cutting means, considered in a plane perpendicular to the movement path of the conveyor means, the clamping members being a part of the second orienting means.

It is preferred that at least one of the clamping members is rotatable about the clamping line and is a part of the orienting means, and is rotated in response to the outcome of the aforementioned comparison in order to turn the bulb axis to a desired orientation with respect to the cutting means, in a plane perpendicular to the movement path of the conveyor means. The axis of the bulb has come to be oriented such that it will be cut exactly at the head and tail.

It is preferred here that the clamping line is horizontal, in case the holder axis is vertical, to enhance the taking over of the bulb.

In a further embodiment the cutting means are adjustable in mutual distance, in response to the outcome of the registration of the circumferential shape of the bulb, and preferably they are adjustable independent from each other. As a result the cutting line can be optimally set at the head and at the tail, even be adjusted to the bulb in question.

The cutting means may be formed by knives, such as blades or rotating circular blades, positioned stationary -yet adjustable in mutual distance- with respect to the movement path of the bulb.

After cutting the conveyor means may lead to a peeling station.

In a further development the device then also comprises a station for peeling the bulbs, which peeling station comprises means for clamping the bulbs stripped of the green end and the root end, according to a second clamping axis perpendicular to the clamping axis of the conveyor clamps, as well as means for cutting through the tunic of the bulb according to cutting lines parallel to the bulb axis. Thus the treatment process can be continued in a smooth line.

The tunic cutting means preferably are adapted for cutting the tunic simultaneously at opposite sides. Preferably the tunic cutting means are positioned for movement past a bulb kept still, as a result of which the reliability of cutting is increased, because the movement of the bulb is kept limited.

The bulb cutting means preferably comprise springmounted blades, as a result of which the bulb shape can be followed. In an advantageous manner the blades may be provided with two cutting edges that face two opposite cutting directions, in order to realise a cutting action in two opposite directions (reciprocal). Thus each bulb surface is engaged by a blade side moved thereto.

In a space saving manner several second clamping means may be arranged on a carousel, a tunic blower for blowing the tunic from the bulb being positioned after the cutting means.

The device according to the invention may be provided with means for rotating the bulb at the location of the tunic blower, by rotating engagement of at least one of the second clamping means, so that blowing off is enhanced.

Preferably the carousel has a horizontal axis of rotation, the second clamping axes also being horizontally oriented. In this way the space is efficiently utilised in horizontal sense.

Preferably the device is furthermore provided with means for releasing the second clamping means after blowing the tunics and with means for receiving the bulb and discharge to a storage for it. At the horizontal second clamping axis the bulbs simply fall onto the reception means.

From another aspect the invention provides a device for peeling bulbous or tuberous plants, particularly onions, already stripped of a green end and a root end, having a bulb axis extending therethrough, furthermore comprising a station for peeling the bulbs, which peeling station comprises means for clamping the bulbs stripped of the green end and the root end, according to a clamping axis perpendicular to the bulb axis, as well as means for cutting through the tunic of the bulb according to cutting lines parallel to the bulb axis.

Further advantageous embodiments of the peeling station have been discussed above.

The device according to the invention has furthermore been provided with a control system, for recording the position of the various parts discussed, the control of the drives for them, all depending on the recording means and the aforementioned means for determining the circumferential shape and the orientation.

The invention furthermore provides a method comprising one or more of the characterizing steps described in the attached description and/or shown in the attached drawings.

BRIEF DESCRIPTION OF THE DRAWINGS

The invention will be elucidated on the basis of an exemplary embodiment shown in the attached drawings, in which:

FIGS. 16A-C schematically show an alternative embodiment of the grippers for the peeling station.

DETAILED DESCRIPTION OF THE DRAWINGS

Figure 1:
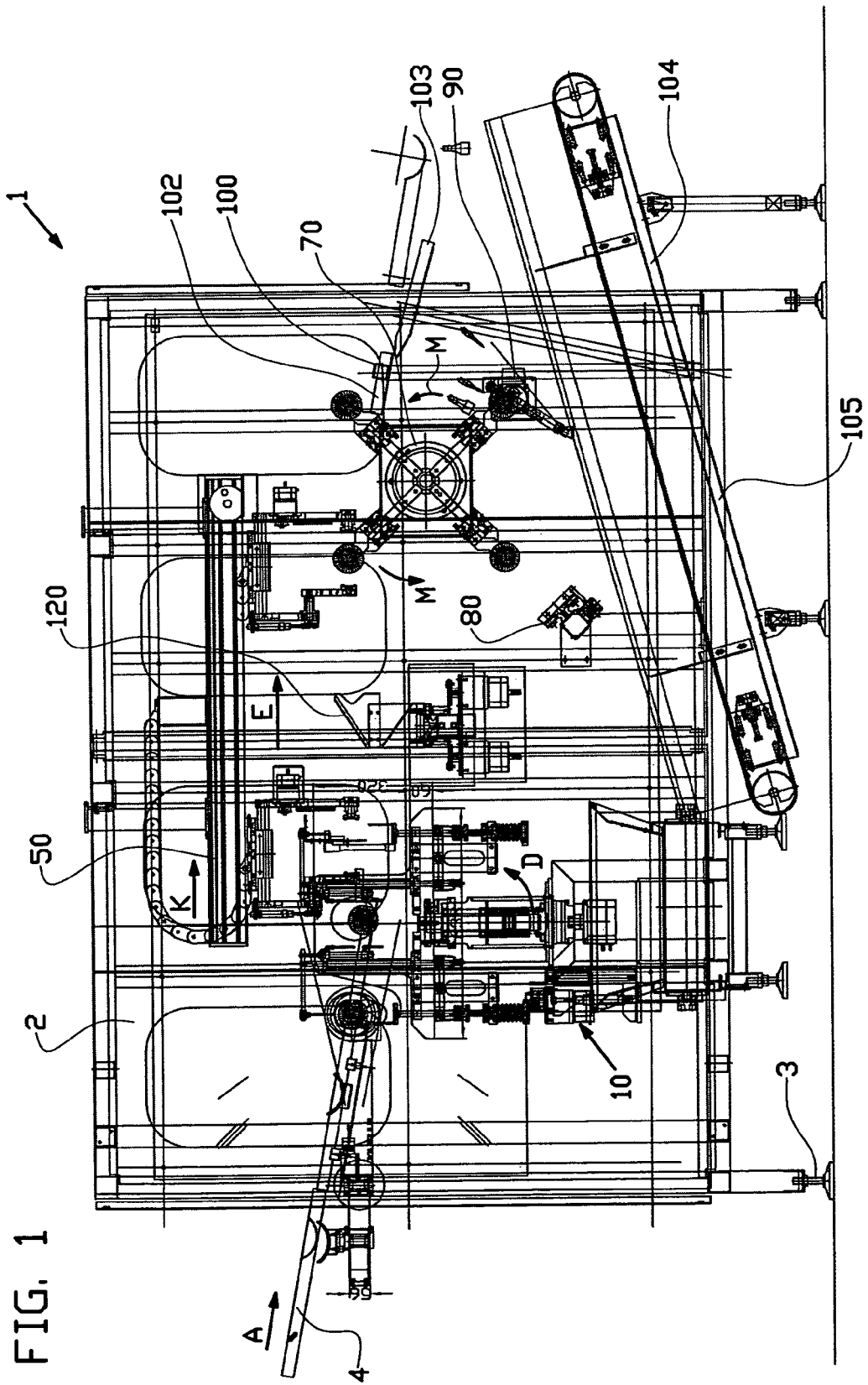
FIG. 1 shows a side view of a possible embodiment of a device according to the invention.

The device 1 shown in figure 1 is adapted for orienting and peeling bulbous plants, particularly onions. Several devices 1 can be placed in a parallel manner and adjacent to each other, having a combined control. The device 1 comprises a housing 2 placed on legs 3. On the left hand side a supply path 4 has been positioned, which supplies bulbs, such as onions, in the direction A, to the orienting station 10, which rotates the onions clamped in the direction D to a transfer conveyor 50, which conveys in the direction K past cutting station 120 to the peeling station 70 provided with four arms, which peeling station rotates in the direction M, consecutively past cutting station 80 and blowing station to a discharge.

Figure 2:
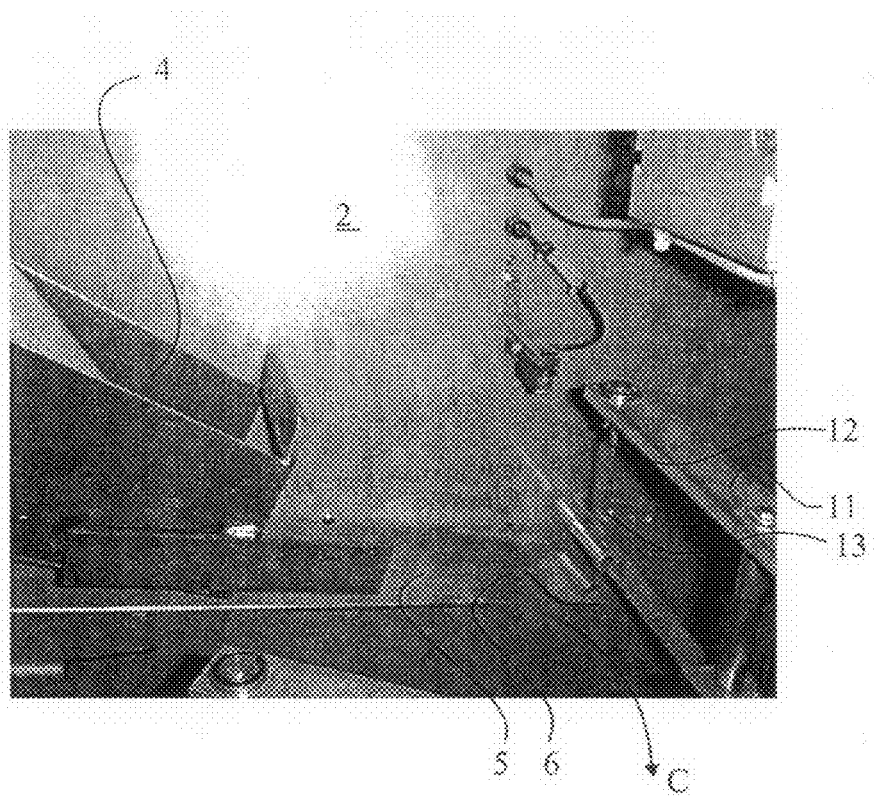
FIG. 2 shows a view of the feed side of the device of FIG. 1.

In FIG. 2 the supply path 4 is shown at the end thereof, having end plate 5, which is provided with a hole 6 opening sideward, which plate 5 can be hinged in the direction C, in order to bring a bulb supported in the hole 6 in the path of the orienting station 10 to be discussed below.

Figure 4:
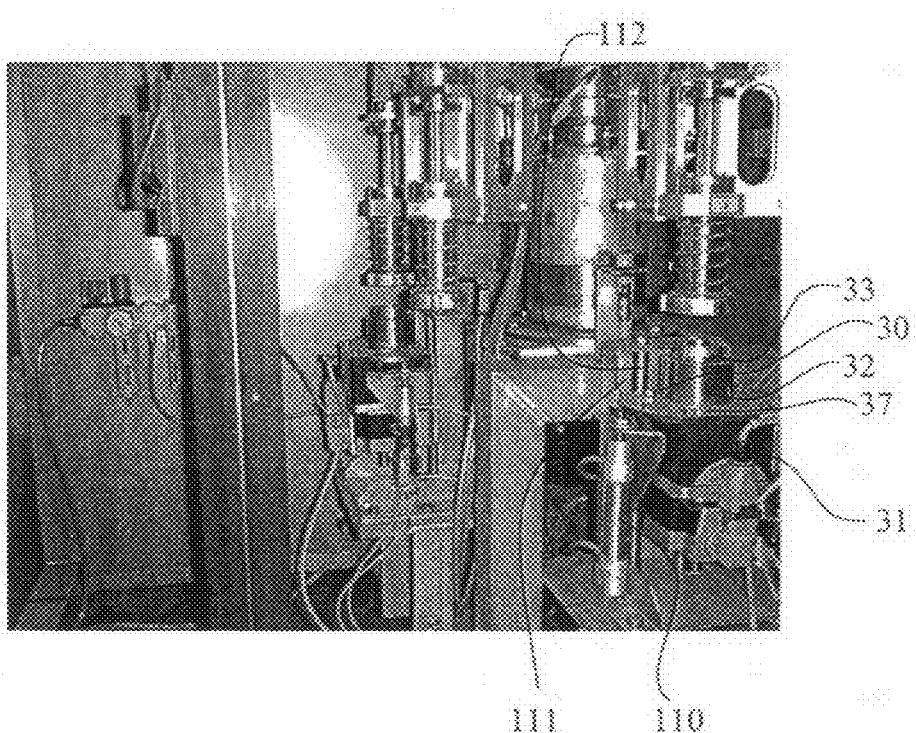
FIG. 4 shows a detail of the orienting station of FIG. 3.
Figure 3:
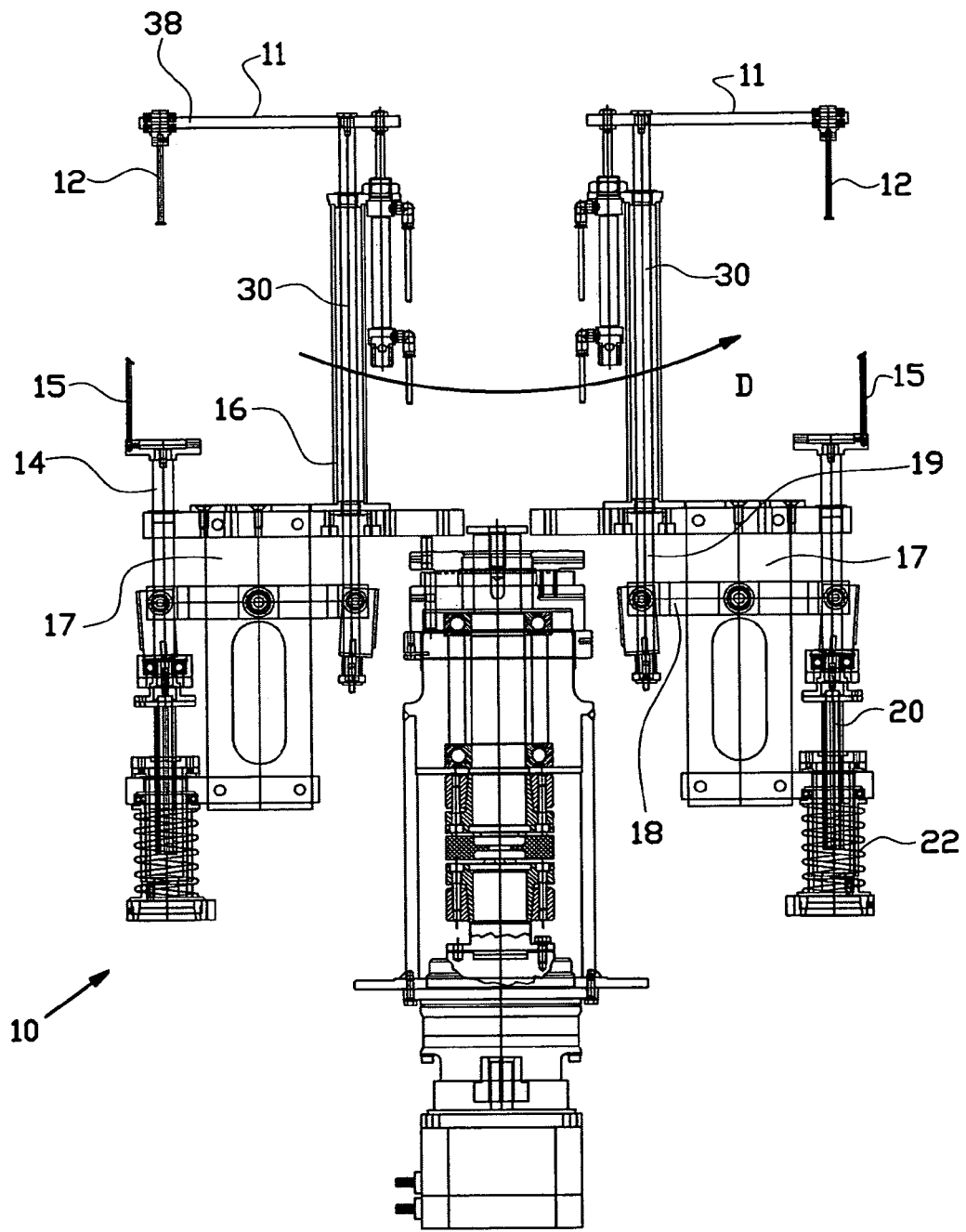
FIG. 3 shows a view of the orienting station in the device of FIG. 1.
Figure 5:
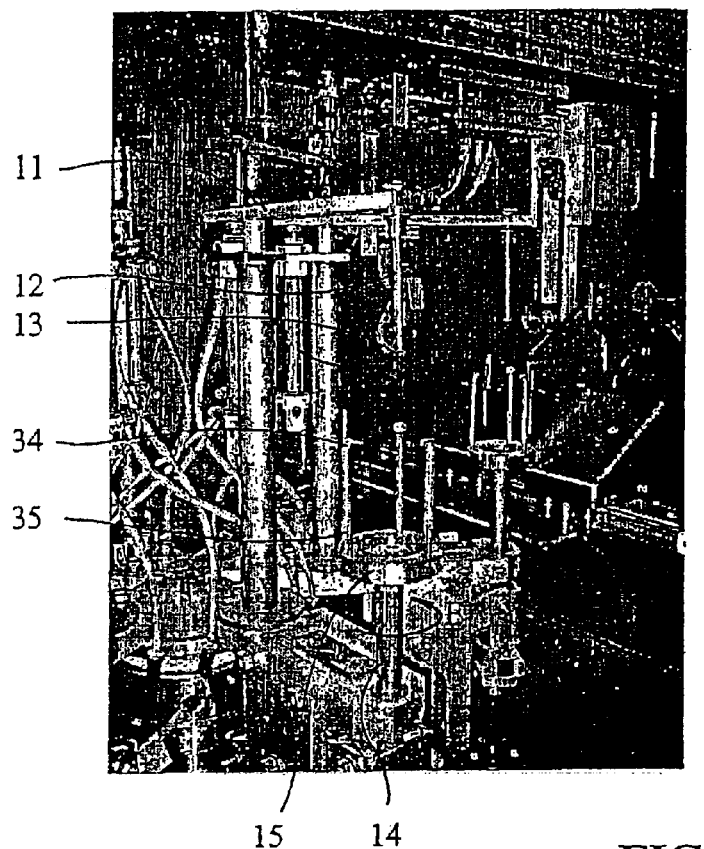
FIG. 5 shows a further detail of the orienting station of FIG. 3.

In the FIG. 3-5 the orienting station 10 is shown more clearly. It regards a carousel here, having—in this example—six units 38, each provided with bulb clamps to be further described. Each bulb clamp comprises an upper horizontal outrigger 11, at the end of which a pin 12 extends downwards, which at the lower end is provided with a clamping surface 13.

At the opposite clamping side thereof a holder 17 is present, in which a lever arm 18 is hingingly accommodated, which lever arm 18 is attached to a pin 14 at the radial outer end in a rotatable manner, on which pin 14 a table 15 is attached, which, as can be seen in FIG. 5, is provided with three pins 34, having inclined clamping surfaces 34 for engaging the bulb surface. Below the connection to the lever arm 18 the rod 14 is continued downwards, to change into rod 20, which is accommodated in a sleeve surrounded by a spring 22, at the lower side of which a coupling plate 32 is attached.

The radial inner end of the lever arm 18 is hinged to the lower end of a rod 19, which extends upwards through sleeve 16 permanent to the carousel and permanently connected to the radial inner end of the outrigger 11.

On two locations or stations, rotation devices 30 are placed below the units 38, as can be seen in FIGS. 3 and 4. Said rotation device 30 have been provided with a plate 37, which is connected to the end of a piston rod of a cylinder assembly 110, which is stationary positioned with another end. A motor/engine? 31 has been attached to the plate 37, which motor can be moved up and down with the plate 37, guided by rod 112 which is attached to permanent holder 111. On top of plate 37 there is a head 32, having coupling member 33 which can be rotated by the motor 31. The coupling member 33 is brought into coupling engagement with the coupling plate 32 through moving upward, while pushing the rod 20 upwards counter to the spring force 22. Due to pushing the rod 20 upwards the lever arm 18 turns, in which, due to the fact that the lever arm is hinged exactly in the centre to the holder 17, the rod 19 is pulled downwards to the same extent as in which the pin 14 is pushed upwards, as a result of which the clamping pins 12 and 34 are moved towards each other to the same extent when a bulb has to be taken over from the aforementioned swung opening 6 of the plate 5.

The rotation motor 31 is also coupled to the rod 20 for rotation transfer and thus to the pin 14, and thus to the three clamping pins 34. The motor 31 can thus rotate the clamping pins 34 in the direction E, when the coupling has taken place.

Figure 6:
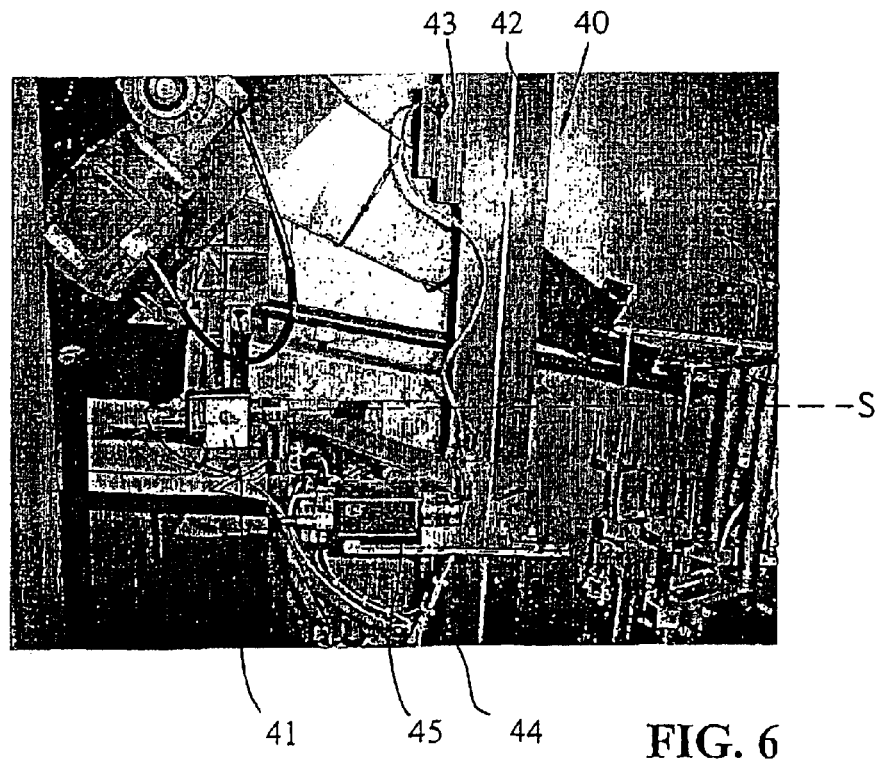
FIGS. 6 and 6A show a view of the shape determining station of the orienting station of FIG. 3.
Figure 6A:
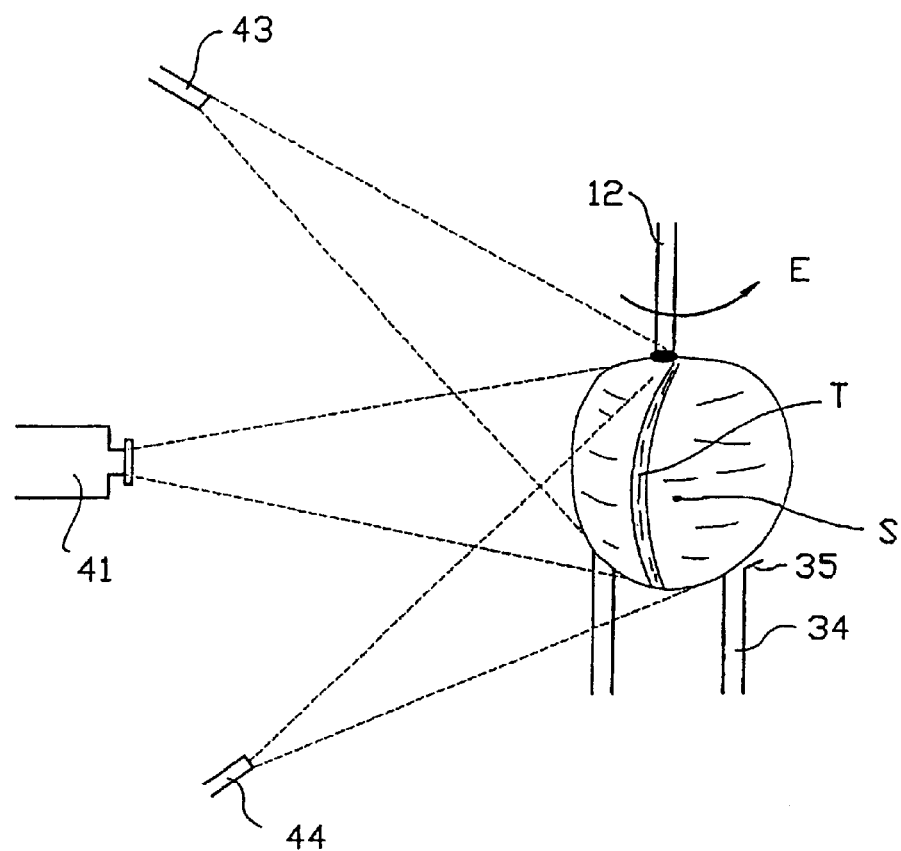

In each rotation station 30 a camera has been placed, to be seen in figure 6, with cameras 41 and 45. They have been positioned having a focus in the same horizontal plane as in which the centre lies between the horizontal planes defined by the clamping surfaces 13 and 35, in figure 6 shown by plane S. The camera 41 is connected in the usual manner to recording and image processing equipment that is not further shown. On standard 42 of the frame of device 1 line lasers 43 and 44 are positioned, and namely above and below plane S. The line lasers 43 and 44 are effective in the same vertical plane and project the curved scan line T situated in the vertical plane on a bulb x clamped between the clamping surfaces 13 and 35.

In this way, after the motor 31 has brought the pins 34 in a uniform rotational motion, a registration can be made with camera 41 of the bulb x during a uniform rotational motion over 360°. The clamping surface 13 here serves as rotational bearing surface. In this way the control unit of the device 1 is able to obtain a complete image of the shape of the bulb x in the computer equipment connected to the camera 41. The image obtained registers the relation between the contour shape and the image angle. With the recorded angle of rotation at a moment during image registration (for instance at the starting moment) and the known angular position after the image recording, the orientation in the world of the bulb axis can be determined.

At the location of the second rotation station, the rotation device 30 can be controlled by the control system of the device on the basis of the analysis of the image recording of the first camera 41, to rotate the rod 20 with clamping pins 34 to an orientation, which is adjusted to the location and operation direction of the transfer mechanism that transfers the bulbs from the orienting station 10 to the peeling station 70, and moves past the head-tail cutting station 120.

Figure 7:
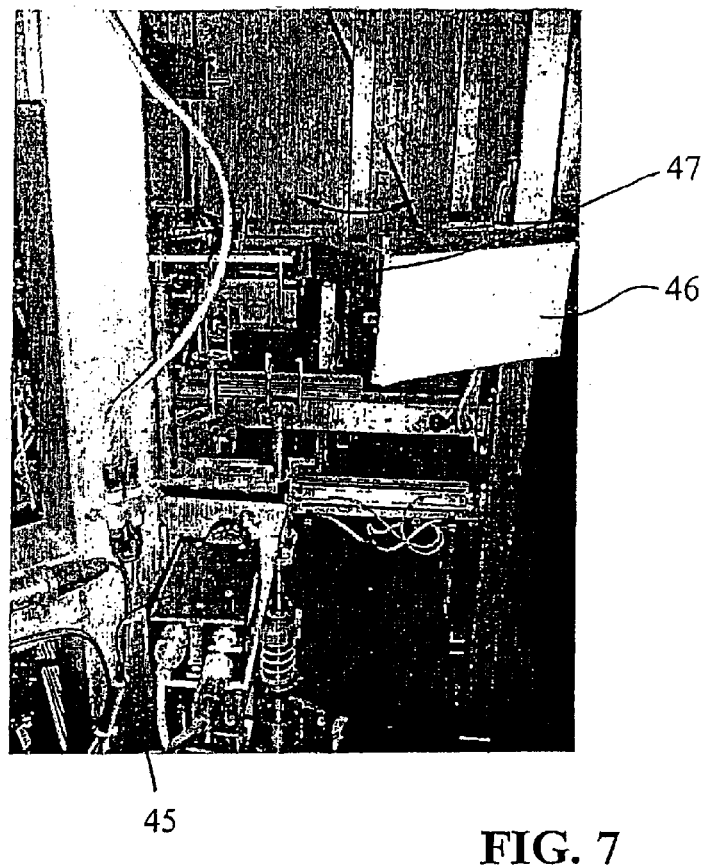
FIG. 7 shows a view of the orienting recording and correction station in the orienting station of FIG. 3.

At the location of the second rotation station the camera 45 has been positioned with its focus also to be situated in the plane S, in this example according to a line which is exactly tangential to the rotation path in the carousel 10 of the centre of the clamping holders. As can be seen in FIG. 7, a screen 46 is positioned at the other side, which screen is attached to an arm 47, which arm can be swung in the direction F by means that are not further shown, when the carousel (which is staggered stepwise, with displacements of in this case with six units 38 over 60°) stands still.

When the screen 46 is placed straight across camera 45, said camera 45 is used to make a registration of the bulb for checking purposes, after said bulb has first been rotated into the correct orientation at that location, and said registration is compared in the said control system with the registration of the camera 41 for the same bulb x. In the control system, the orientation in the horizontal plane of the bulb axis, that means the centre line/axis? going through both ends of the bulb, of the bulb x present at the second rotation station 30, is established. Based on the outcome of said calculation the second rotation motor 31 is if necessary controlled again to rotate the rod 20 with clamping pins 34 to the correct orientation.

In this example, in which the location of transfer is situated 120° downstream of the second rotation station, the bulb x is finally rotated such that the plane in which the bulb axis is situated is below 60° to the radial in which the clamping units 38 are situated.

The registration of the second camera 45 is stored in the control system, and coupled to the registration of the first camera for the bulb in question.

Figure 9:
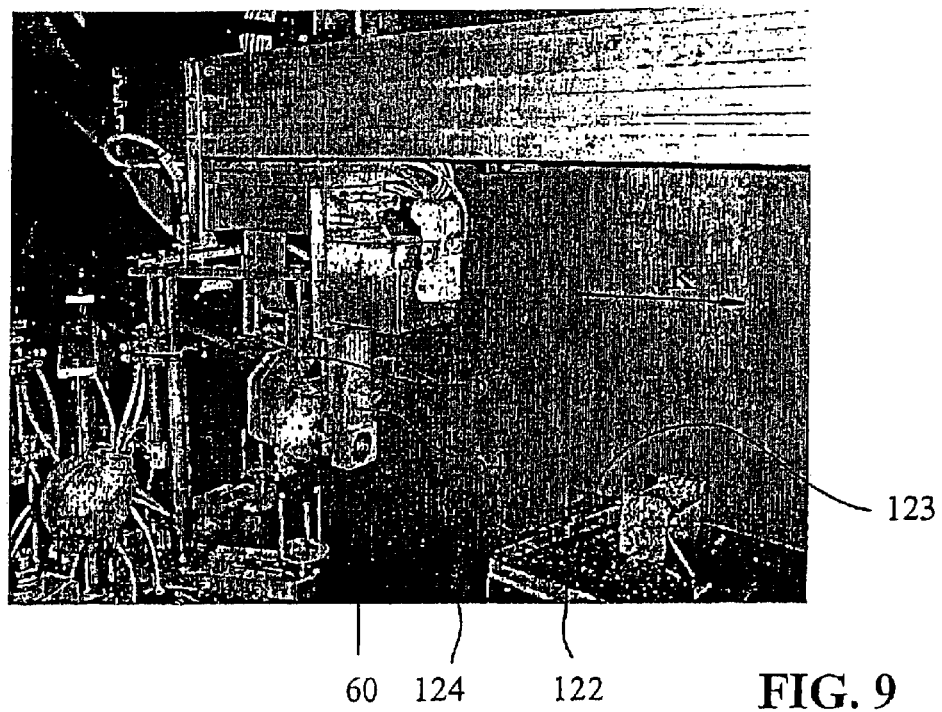
FIG. 9 shows the taking-over or transfer station of FIG. 8 seen from the other side.
Figure 8:
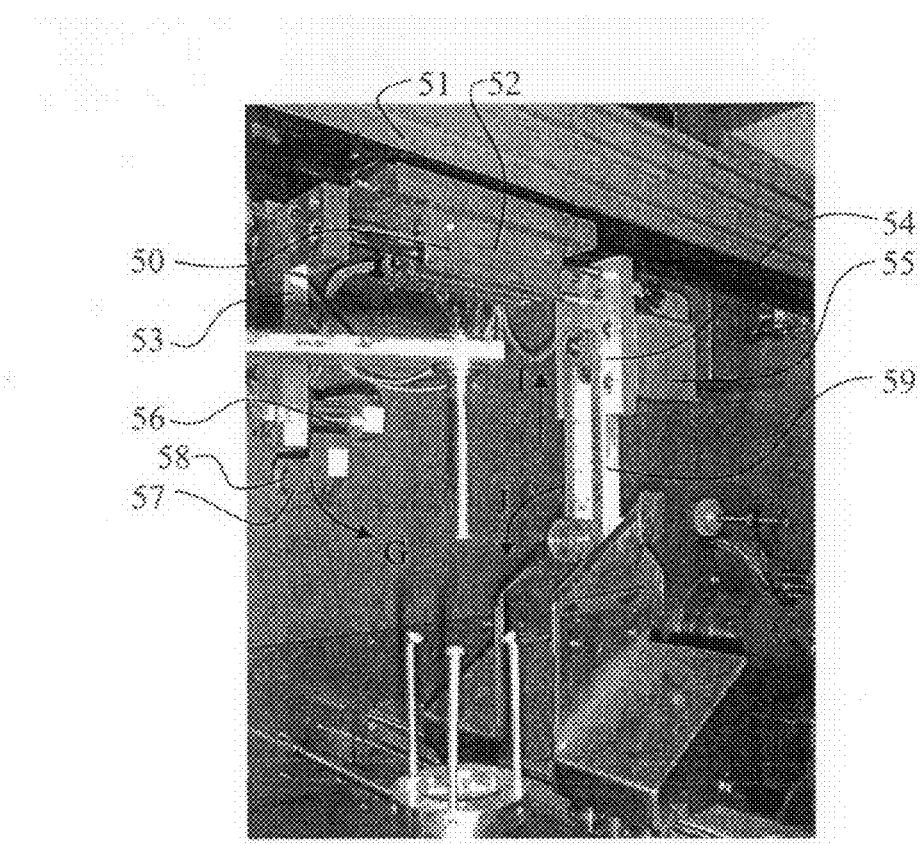
FIG. 8 shows a view of the taking-over or transfer station at the downstream side of the orienting station of FIG. 3.

After uncoupling with the rotation motor 32, the bulb x in question is brought in two carousel steps at the location of the transfer device 50, shown in the FIGS. 8 and 9. The transfer device comprises a permanent beam 51, in which a drive mechanism that is not further shown for a carriage 52 is shown. The beam 51 is provided with a guide for the carriage 52, which reciprocates in the direction K. On the carriage 52 two arms 53 and 54 extending downwards are provided, which can be moved towards each other and away from each other again, by means that are not further shown, controlled by the control unit. At the lower end of the arms 53 a pivot pin 56 is attached, at the end of which a plate 57 is attached rotatable in the direction G, which plate is provided with a clamping plate 58.

At the lower end the other pending arm 54 is provided with a clamping plate 60, which is rotatably bearing mounted to be able to be rotated by means of the toothed belt 59. The toothed belt 59 is driven by motor 55.

When, as can be seen in FIG. 9, a bulb x has arrived at the location of the transfer station, the plate 57 is swung downwards in the direction G by the control system, in order to horizontally align the clamping plate 58 with the clamping plate 60, also in the horizontal plane S. Then both plates 53 and 54 are moved towards each other, to let the clamping plates 58 and 60 clamp the bulb x in between them. This is shown in FIG. 9.

Particular now is that based on the contour data of the bulb x present in the control system the orientation of the bulb axis in the vertical plane is also known. Said data are already known at the registration of the first camera, but also at the registration of the second camera, for checking purposes. On the basis of said data the motor 55 is controlled by the control system to turn the bulb axis, to rotate to a horizontal position, the bulb being borne on the clamping plate 58. The clamping plate 60 is designed such that it engages the bulb x immediately for reliable rotation.

Figure 13:
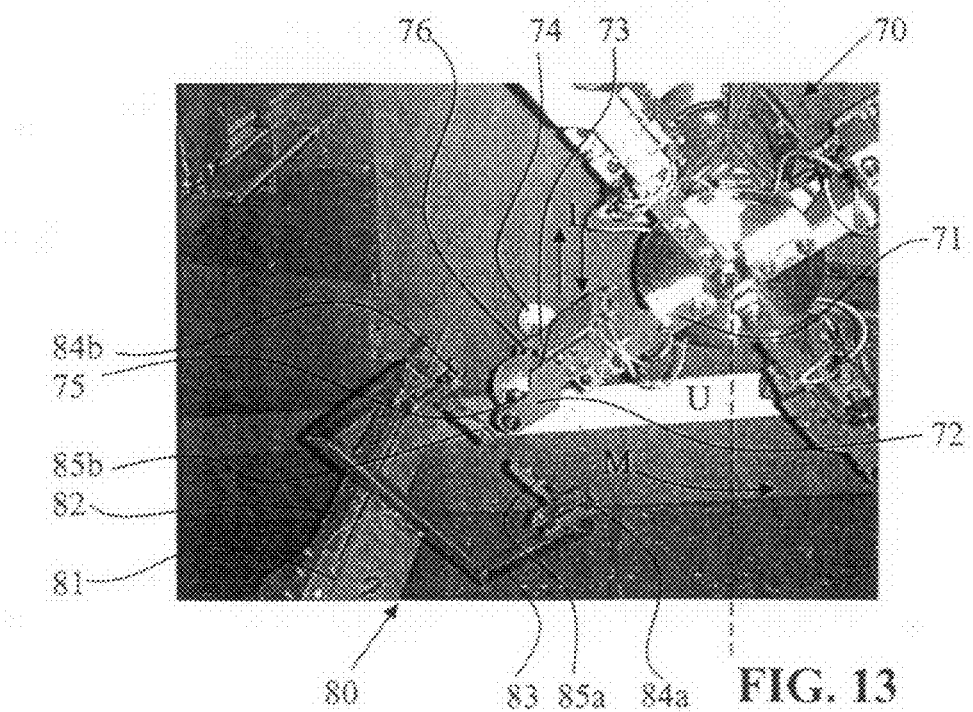
FIG. 13 shows the peeling station at the location of cutting the tunic.
Figure 11:
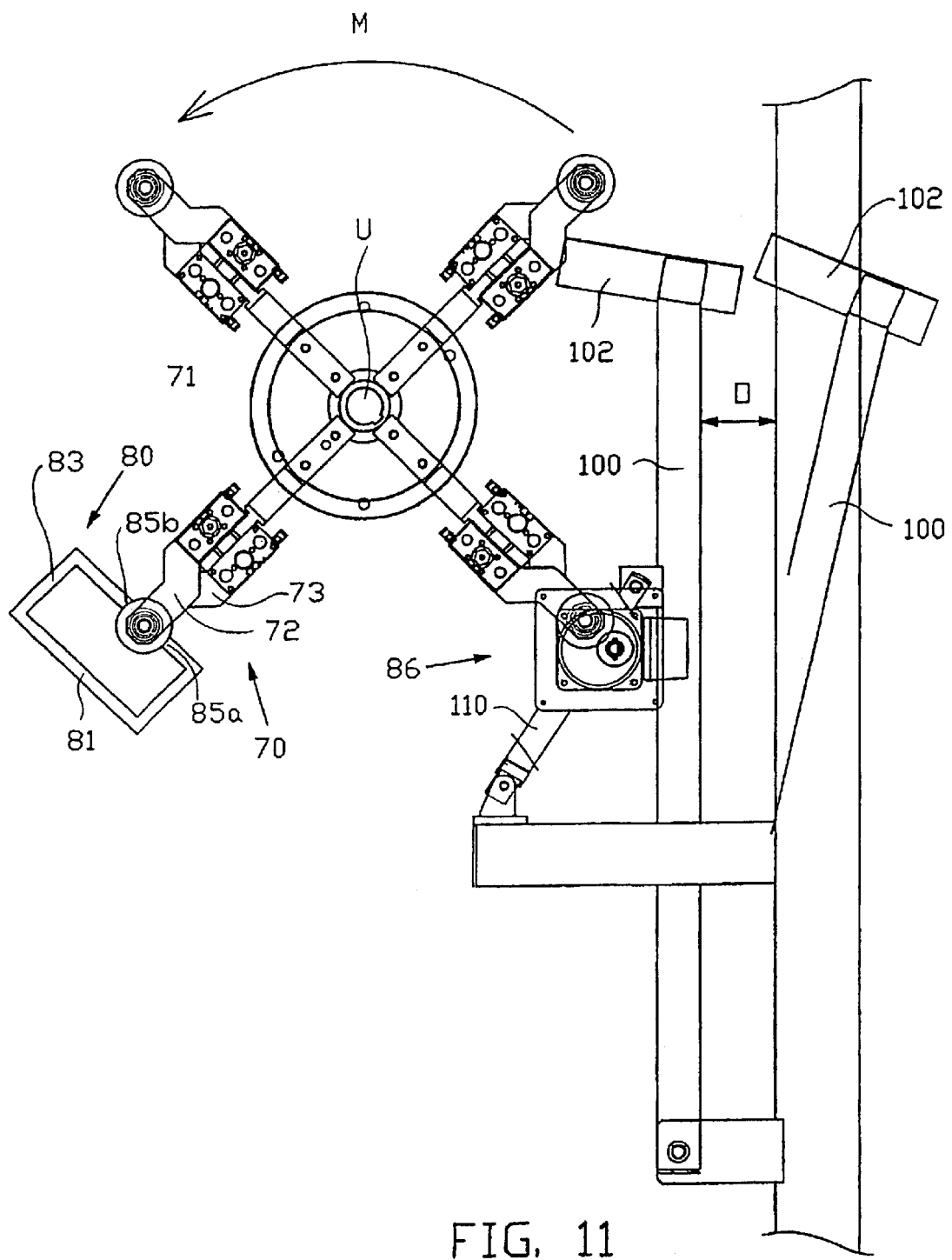
FIG. 11 shows the peeling station of the device according to FIG. 1, in front view.
Figure 12:
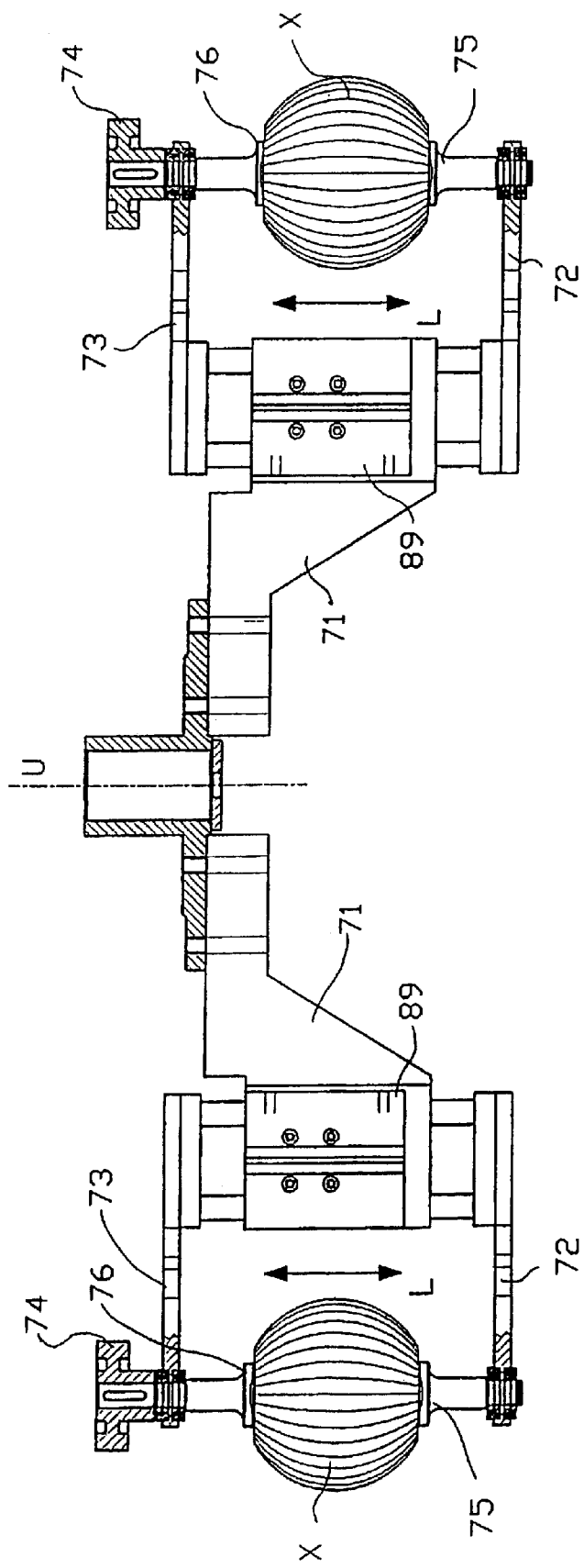
FIG. 12 shows the peeling station of FIG. 11, in partial and schematic top view.

The carriage 52 is controlled immediately after that by the control system, moved in the direction K, in order to transfer the bulb x to the peeling station 70, shown in the FIGS. 11-13. During said transfer the head and tail are cut off in station 120.

Figure 14B:
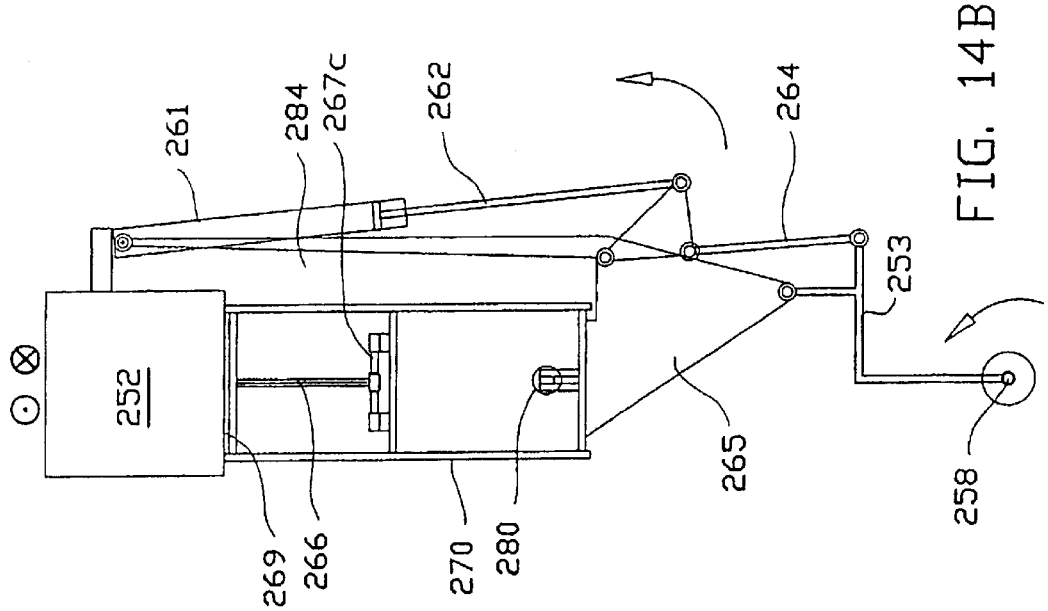
FIGS. 14A and 14B show schematic views of a free position and an operative position, respectively, of an alternative for the bulb grippers of the transfer station that is operative between the orienting station and the peeling station.
Figure 14A:
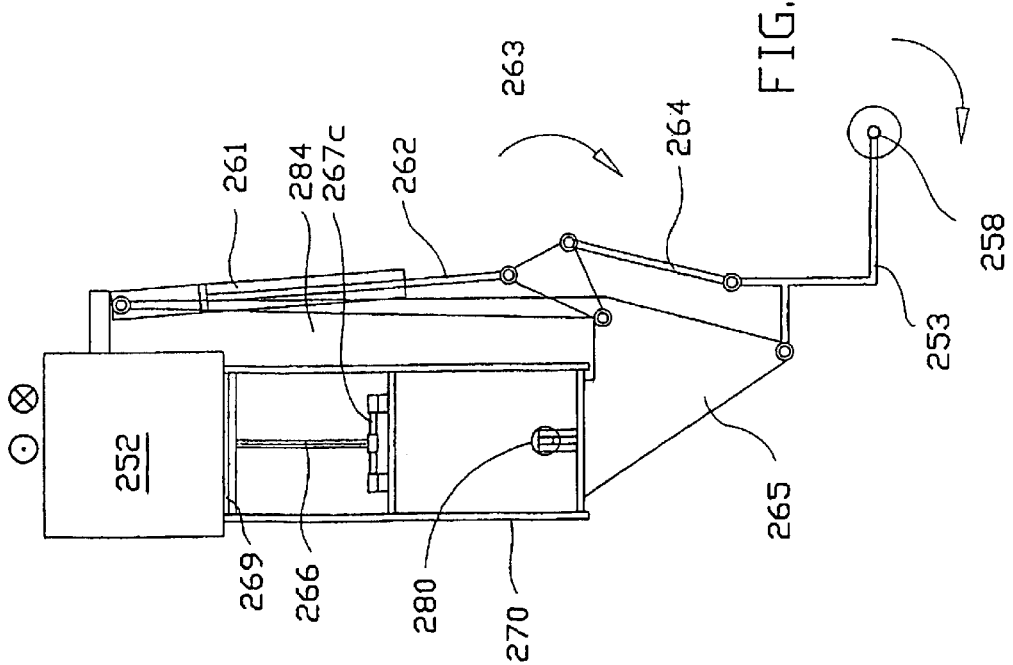

In the FIGS. 14A,B and 15A-F an alternative is shown for the mechanism of the clamping arms 52, 53. In a schematic manner the carriage 252 is shown here, which just like carriage 52 is linearly and reciprocally moveable, controlled by a control system, of the second rotation station to the peeling station, past the cutting station.

A plate 269 is permanently attached to the carriage 252. In an indirect manner, moveable in the horizontal plane (with respect to the plate 269), a substantially vertically extending cylinder 261 is attached to the plate 269 and thus to the carriage 252, which cylinder at the upper end is attached to a vertical plate or rod 284 and with the end of a piston rod 262 is connected to a triangle 263 tiltable in the vertical plane, which triangle is hinged to a plate or rod 284. At the third tip of the triangle 263 a rod with hinge ends 264 is hinged which with the other end is hinged to an arm 253, which is also hinged to a further triangle 265, which is permanent to the aforementioned plate or rod 284. The other end of the arm 253 is provided with a bulb clamping plate 258.

As can in FIGS. 14A,B, the piston rod 262 will expand when the cylinder 261 is operated, and as a result the triangle 263 will rotate, because of which also the arm 253 will rotate from the free position shown in FIG. 14A to the operational or engagement position shown in FIG. 14B. This displacement concept having hinge points is simple as to structure and failure proof, due to the absence of linear guides.

After the clamping plate 258 has been brought into the operational position, said clamping plate and the clamping plate 260 active at the other side are brought towards each other, to clamp the bulb in between them, as has been described for the embodiment described in FIGS. 8 and 9. However, said movement is carried out in a different manner.

To that end use is made of an arrangement having a cylinder and turn rods, schematically shown in FIGS. 15A-F. The arm 253 and the triangle 265 are hinged via triangle 282 to a double frame 270a, and the opposite arm 254, via triangle or square plate 283, to frame 270b. The frames 270a,b are parallelogram shaped, having hinges in the corners. Between the lower ends of the frames 270a,b there is a cylinder 280 extending horizontally and in movement direction, which cylinder is attached to the triangle plate 282 and to plate 284 and with the end of the piston rod attached to the plate 283.

Figure 15A:
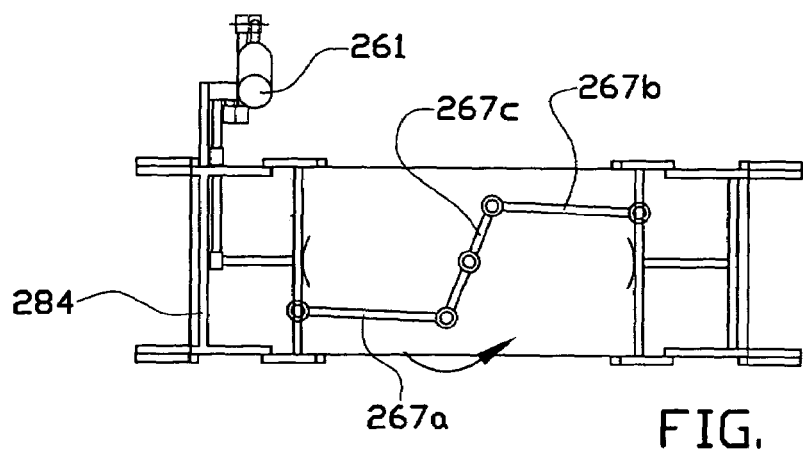
FIGS. 15A,C,E and FIGS. 15B,D,F show schematic top views and schematic side views, respectively, of the transferrer having bulb grippers according to FIGS. 14A,B.

Halfway their height the frames 270a,b are also connected to each other by means of rod assembly 267a-c, which has the shape as can be seen in FIGS. 15A,C,E. The coupling rod 267c is attached at the centre to the lower end of a vertical rod 266, which with the upper end is attached to the plate 269 which is permanent to the carriage 252. The frames 270a,b are hinged to the plate 269.

Figure 15B:
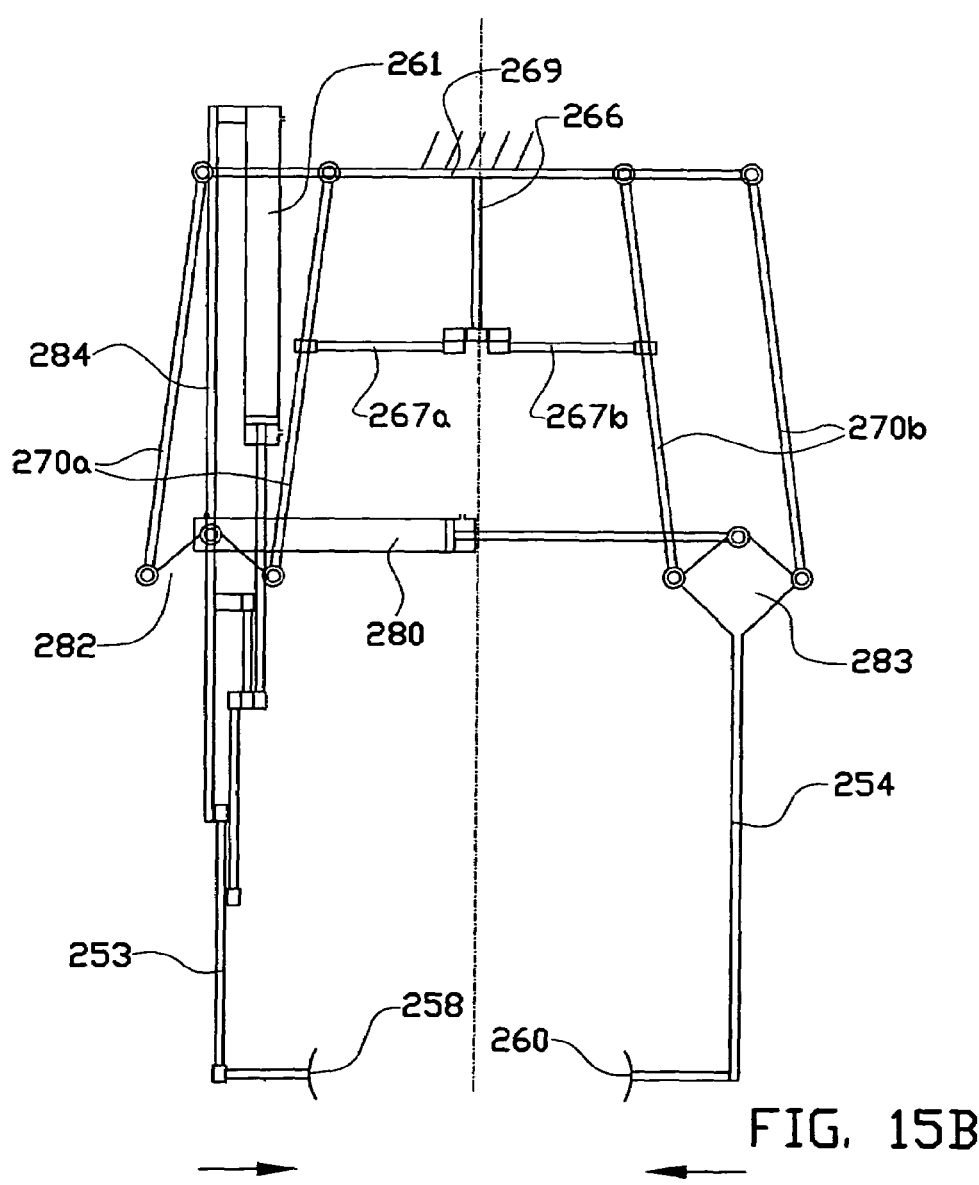
Figure 15C:
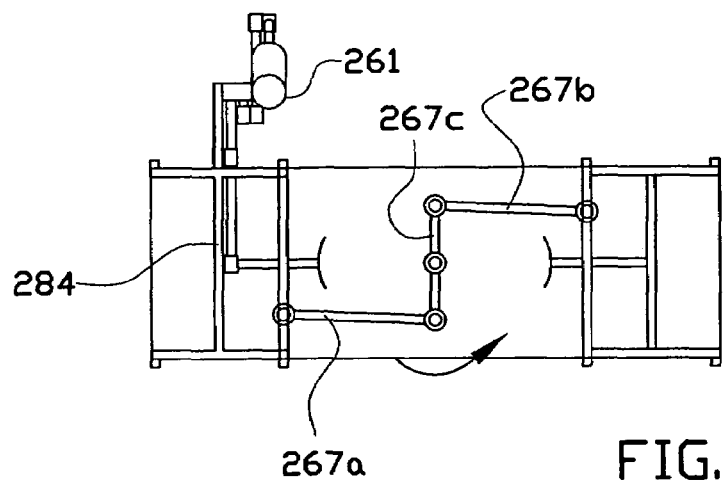
Figure 15D:
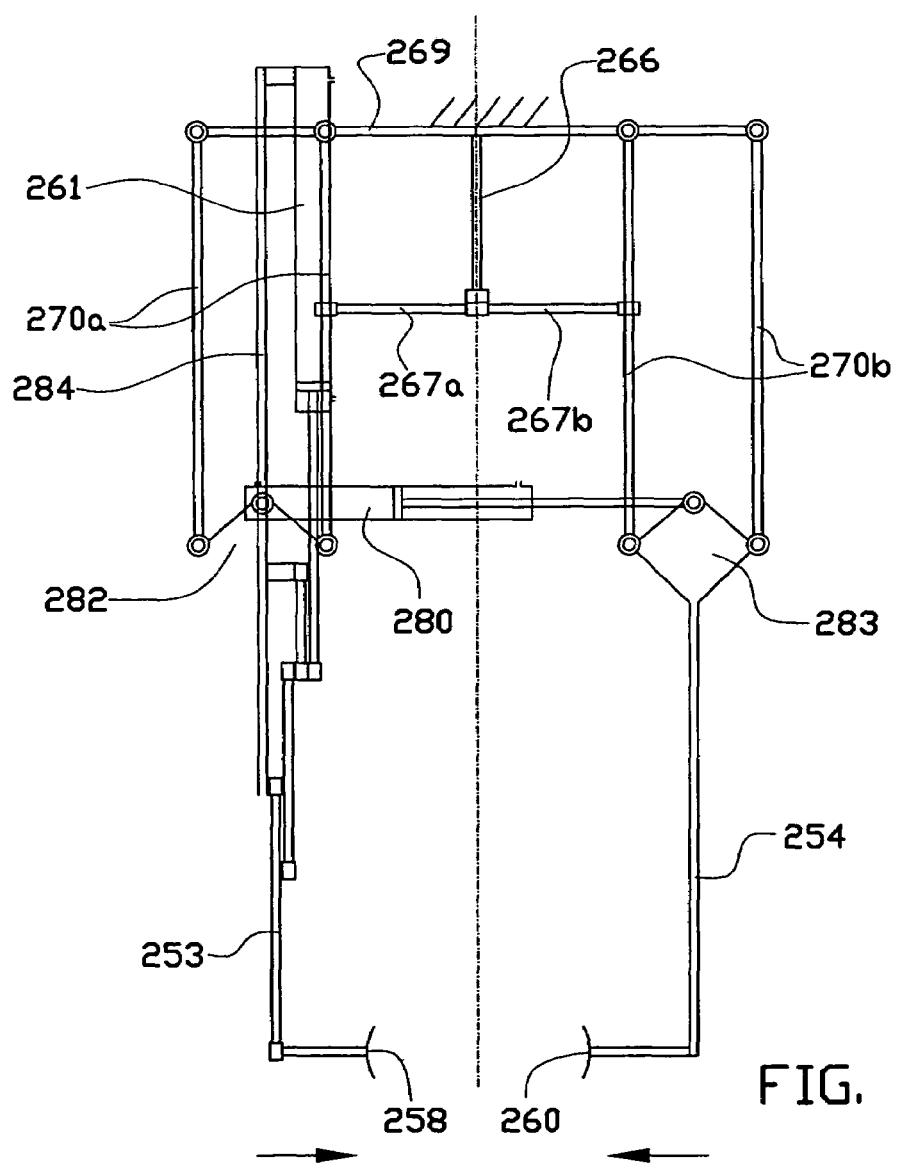
Figure 15E:
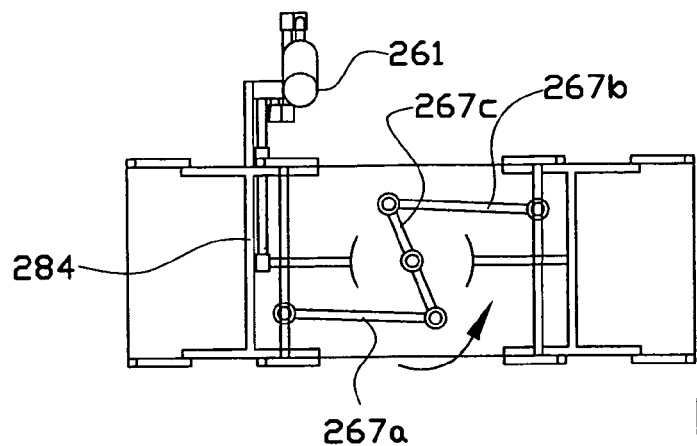
Figure 15F:
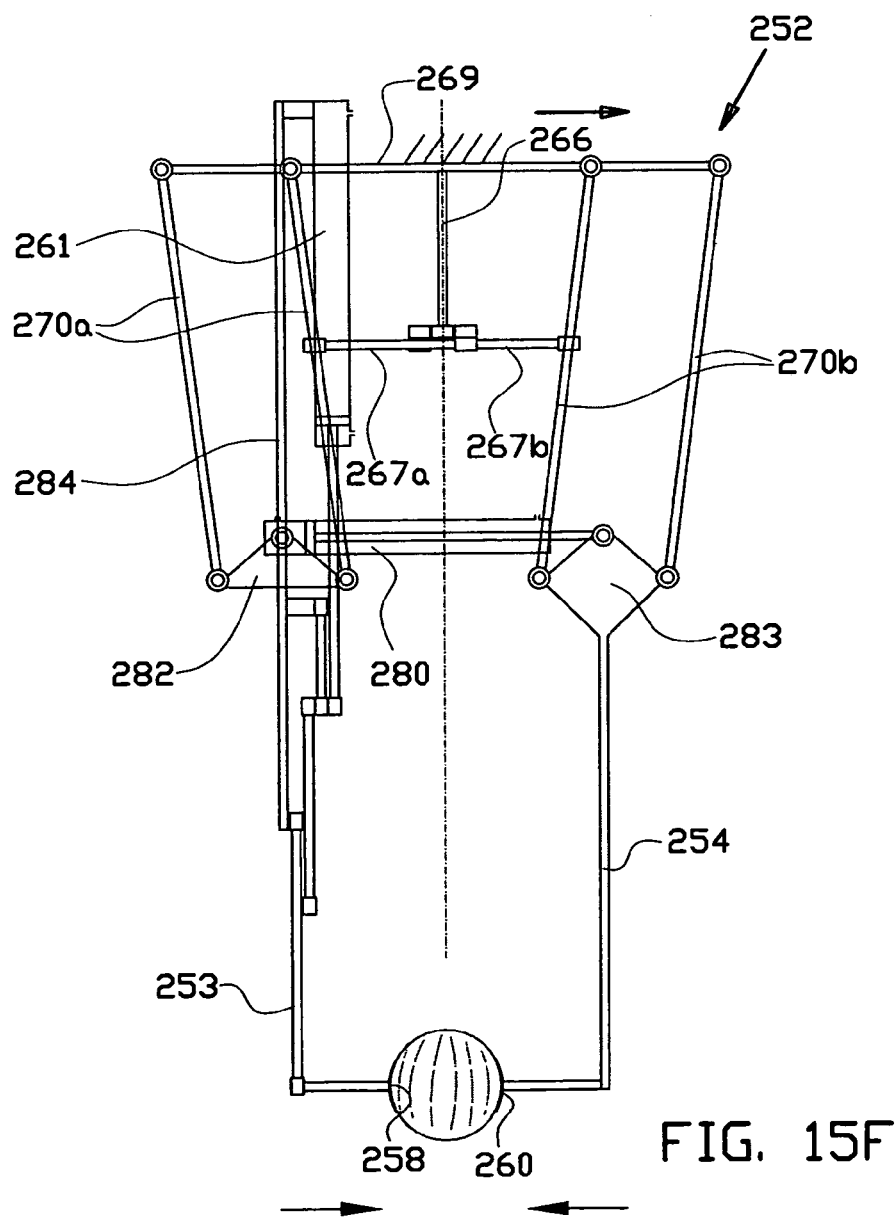

For the movement of the arms 253, 254 from the position shown in FIG. 15B to the position of FIG. 15F, to be able to clamp a bulb in between the clamping plates 258, 260, the cylinder 280 is operated as a result of which the triangles 282 and 283 are moved towards each other. The rod assembly 267a-c then also turns about the centre line of the vertical rod 266, as a result of which the tilting motion of the frames 270a,b is equal (yet opposite). Thus the clamping plates 258, 260 are moved towards the bulb with equal displacement size.

As can be seen when comparing the FIGS. 15B,D,F, the frames 270a and 270b are subjected to change of shape due to rotation in their vertices.

When the positions shown in FIGS. 14B and 15F, respectively, are realised, cylinders 261 and 280 are kept at pressure, to fixate the position achieved. After that the carriage 252 (not shown in the FIGS. 15), just like carriage 50, can be moved to the cutting station and the peeling station.

The low position of the cylinder 280 is advantageous for the transfer of clamping forces on the bulb. The use of rods and hinge points here also limits the wear.

Figure 10:
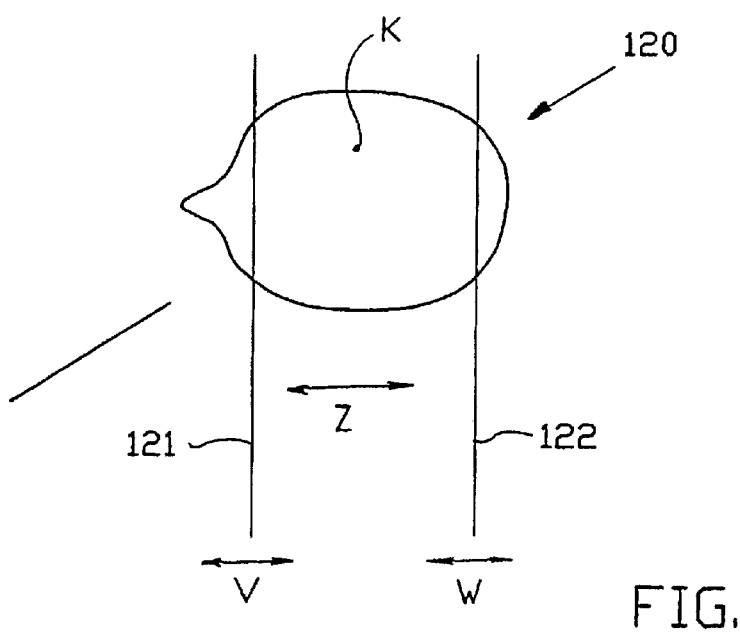
FIG. 10 shows the cutting station of the device of FIG. 1.

In FIG. 10 the cutting station 120 is shown, which is permanently positioned within the device 1, and is provided with blades 121, 122, which are situated in a vertical plane parallel to each other. They are provided with respective inclined cutting edge 123, 124, and by means of means that are not further shown driven by the control system, can be adjusted as to location in horizontal direction transverse to the path K. The mutual distance z can be set as a result, adjusted to the contour of the bulb x determined earlier. It is possible here to set the blades 121, 122 independent from each other in the direction V or W. In this way it can be prevented that too much head or tail is cut off from the bulb x, during conveyance in the direction K, past, or through the cutting station 120. The mutual distance of the blades 121, 122 can be set by the control system, on the basis of the registrations of the first, particularly the second camera.

The transfer conveyor 50 has now brought the bulb x, now provided with two flat ends, at the location of the peeling station 70, shown in FIGS. 11-13.

It is noted that in stead of the combination girder 51/carriage 52, in which the bulb is moved according to a straight line, other transfer devices are possible, for instance a transfer device which carries out a swaying motion, in which the clamping plates have been arranged at the lower end of an arm that can be swayed in a vertical plane. In the aforementioned arrangement with several parallel treatment paths the drive of several, parallel positioned swayable arms can be combined.

The peeling station 70 comprises four radial arms 71, which in the manner of a windmill are rotatable about a horizontal axis U in the direction M. The rotation in the direction M is controlled stepwise by the aforementioned control system.

Each arm 71 has two end arms 72, 73 which extend horizontally at a distance from each other, and each are provided with clamping plates 75 and 76, respectively. The arms 72 and 73 can be moved towards and away from each other in the directions L by means of drive 89, driven by the control system. At the other side of clamping plate 76 the arm 73 is provided with a pin having pinion 74, the clamping plate 76 being rotationally fixed with respect to the pinion 74 and able to rotate freely with respect to the arm 73.

After clamping the bulb x in between the arms 72, 73 the mill 70 is rotated over 90° in the direction M, in order to bring the bulb x at the location shown in FIG. 13. At that location a tunic cutting station 80 is situated, having carriage 81 which is reciprocally moveable in the direction N, transverse to the plane of rotation of the mill 70. There is a U-frame 83 situated on the carriage 81, at the leg ends of which U-frame blade holders 84a, 84b are attached. They are provided with blades 85a, 85b which are provided with cutting edges in two opposite directions. They are positioned at a distance from each other which makes it possible to be moved past the arms 72 and 73. In the situation shown in FIG. 13, the carriage 81 is reciprocally moved in the direction N, to let the blades 85a, 85b cut over the surface of the bulb x in both the leading and the returning stroke. The blades 85a, 85b are spring-mounted in the blade holders 84a, 84b in order for them to be able to follow the surface of the tunic of the bulb x during cutting the tunic. In this way it is achieved that cutting takes place no deeper than the outer layer (tunic).

Subsequently the mill 70 is rotated again over 90° to the next station, where a toothed gear 86 is positioned, which comes into engagement with pinion 74. A blower 90 is furthermore positioned there, which is directed at the tunic of the bulb x. The control system now simultaneously turns the pinion 86 and thus the pinion 74 and thus the clamping plate 76, and thus the bulb x. The blower 90 blows in the incisions in the tunic, as a result of which the tunic is detached and falls onto the belt conveyor 104 placed underneath it. Said belt conveyor 104 is provided with a conveyor 105 driven in the direction P, to discharge the skins to a reception tray that is not shown.

After removal of the tunic the mill 70 is rotated again over 90° by the control system, to a position as can be seen in FIGS. 1 and 11, in which a reception plate 102 can be brought under bulb x which plate is attached to swing rod 100 which can be reciprocally moved by cylinder 110 in directions O. Then the arms 72 and 73 are moved apart and the bulb can fall onto the plate 102 and roll off from it, via chute 103, in a reception means such as a box that is not further shown. Said box is discharged in the direction Q.

FIGS. 16A-C very schematically show an alternative operation of the clamping plates in the peeling station. Instead of the always parallel extending arms 72 and 73, parallelogram shaped arms 372, 373 are now provided, which consist of a number of hinging rods that are connected to each other. Part 389 does not need to have moving parts here. The moving parts may extend directly between the arms 372 and 373 for instance in the form of cylinders 390a, b positioned crossways. By operating the cylinders 390a, b the arms 372, 373 can be internally rotated, according to the steps shown in FIGS. 16A,B,C. In the position shown in FIG. 16C the clamping plates 375 and 376 clamp a bulb in between them with the same clamping force as in the arrangement of FIG. 12.

The invention claimed is:

1. Device for treating a bulbous or tuberous plant having a green end and a root end and a bulb axis extending therethrough, said device comprising holding means for holding a bulb, cutting means for cutting the green end and the root end off the bulb, image registration means for determining an orientation in the device of the bulb held in the holding means, and orienting means for orienting the bulb in any of a plurality of orientations so that the orientation of the bulb can be adjusted to the cutting means on the basis of said determination, said device further comprising a first camera, as well as means for rotating the first camera and the bulb with respect to each other about an axis relatively stationary with respect to the first camera in the image field of the first camera, and means for registering a circumferential shape of the bulb perceived by the first camera and means for analysing the registration for determining the circumferential shape.

2. Device according to claim 1, comprising rotation means for rotating the bulb about its axis.

3. Device according to claim 1, the cutting means comprising first and second cutting means which are adjustable in mutual distance based on the outcome of the registration of the circumferential shape of the bulb.

4. Device according to claim 1, the image registration means comprising means for establishing the orientation of the bulb after the registration of the means for registering circumferential shape on the basis of a known registration direction of the first camera, the registration of the first camera related to a time or an angle of rotation of the bulb and an angle of rotation traversed after ending the registration of the means for registering circumferential shape, the orienting means comprising first orienting means for orienting the bulb in a plane of rotation on the basis of the orientation determined by the image registration means.

5. Device according to claim 3, the first and second cutting means being adjustable independent from each other.

6. Device according to claim 4, furthermore comprising a second camera for recording a contour of the bulb at a stationary location and means for determining the orientation at that location of the bulb axis in a plane perpendicular to the plane of rotation.

7. Device according to claim 4, furthermore comprising checking means for checking the orientation of the bulb in a plane of rotation given by the first orienting means.

8. Device according to claim 7, furthermore comprising additional orienting means for correction of the orientation in the plane of rotation.

9. Device according to claim 7, the checking means comprising a second camera for recording a contour image of the bulb at a stationary location, and means for determining the orientation at that location of the bulb axis with respect to the device by comparing the contour image with the circumferential shape made by the first camera, the additional orienting means being controlled on the basis of the outcome of said comparison.

10. Device according to claim 8, the rotation means comprising first rotation means, positioned at a first station, where the first camera has been positioned, for cooperation with the first orienting means, and second rotation means, positioned at a next, second station, where the second camera has been positioned, for cooperation with the additional orienting means.

11. Device according to claim 9, furthermore comprising contrasting means for contrasting the circumference of the bulb with a background.

12. Device according to claim 11, the contrasting means comprising a bright background surface that can be placed at a side facing away from the second camera.

13. Device for treating a bulbous or tuberous plant having a green end and a root end and a bulb axis extending therethrough, said device comprising holding means for holding a bulb, cutting means for cutting the green end and the root end off the bulb, image registration means for determining an orientation in the device of the bulb held in the holding means, and orienting means for orienting the bulb in any of a plurality of orientations so that the orientation of the bulb can be adjusted to the cutting means on the basis of said determination, the holding means comprising a first holder member for engaging a first side of the bulb and a second holder member for engaging an opposite, second side of the bulb, the first holder member being positioned rotatably about a holder axis.

14. Device according to claim 13, the first holder member comprising several bulb engagement surfaces for engaging the first side of the bulb at locations evenly distributed over the bulb axis.

15. Device according to claim 13, the second holder member forming a rotary bearing for the second side of the bulb.

16. Device according to claim 13, the first and second holder members being arranged on a circulating frame, and wherein at a location of image registration rotation means are positioned which can be brought in and out of driving coupling with the first holder member.

17. Device according to claim 13, furthermore provided with conveyor means for conveying the bulb from the first and second holder members past the cutting means, which conveyor means are provided with a plurality of clamping members for taking over the bulb from the holder members and clamping the bulb according to a clamping line perpendicular to the holder axis.

18. Device according to claim 16, the rotation means being positioned at the location of the image registration, which rotation means can be brought in and out of driving coupling with the first holder member and rotate the first holder member in accordance with the outcome of a comparison to a known orientation of the bulb axis in a plane perpendicular to the holder axis.

19. Device according to claim 16, the first holder member being a part of the orienting means.

20. Device according to claim 16, the circulating frame having a circulation axis that is oriented vertically.

21. Device according to claim 17, the orienting means comprising second orienting means for bringing the bulb in a correct orientation for the cutting means, considered in a plane perpendicular to a movement path of the conveyor means, the clamping members being a part of the second orienting means.

22. Device according to claim 21, at least one of the clamping members being rotatable about the clamping line and being rotated in response to the outcome a comparison to a known orientation of the bulb axis in order to turn the bulb axis to a desired orientation with respect to the cutting means, in a plane perpendicular to the movement path of the conveyor means.

* * * * *